United States Patent [19]

Torii et al.

[11] 4,376,961

[45] Mar. 15, 1983

[54] MAGNETIC DRUM/HEAD SYSTEM FOR SELECTIVELY GENERATING RECORDED VOICE INFORMATION

[75] Inventors: Michihiro Torii, Hamamatsu; Takao Moritomo; Kouichirou Suzuki, both of Arai; Tadashi Yoshino, Hamamatsu; Norifumi Itoh, Shizuoka; Tetsuya Suzuki, Tawara, all of Japan

[73] Assignee: Fuji Electrochemical Co., Ltd., Tokyo, Japan

[21] Appl. No.: 269,672

[22] Filed: Jun. 2, 1981

[30] Foreign Application Priority Data

Jun. 3, 1980 [JP] Japan ............................. 55-76878[U]
Jun. 3, 1980 [JP] Japan ............................. 55-76879[U]
Jun. 18, 1980 [JP] Japan ............................. 55-85476[U]
Jun. 18, 1980 [JP] Japan ............................. 55-85477[U]

[51] Int. Cl.³ .................. G11B 5/55; G11B 15/18; G11B 5/00
[52] U.S. Cl. .................................... 360/106; 360/12; 360/72.1
[58] Field of Search ............... 360/12, 72.1, 100, 102, 360/106, 136

[56] References Cited

U.S. PATENT DOCUMENTS 2,832,841 4/1958 Eldridge, Jr. ..................... 360/106
3,409,745 11/1968 Kock ................................. 360/12
4,276,572 6/1981 Hayashi et al. .................... 360/12

*Primary Examiner*—Vincent P. Canney
*Attorney, Agent, or Firm*—Fleit, Jacobson & Cohn

[57] ABSTRACT

A magnetic drum/head system for selectively reproducing voice information recorded on the magnetic drum. The magnetic drum has a recording zone in which predetermined voice information is recorded in each track thereof and a non-recording zone between a starting end of the recording zone and a terminating end of the same. In case of a track selection, the magnetic drum is held still so that the non-recording zone is in a confronting relation to the magnetic head, and the magnetic head is driven to move along the non-recording zone to the selected track. The magnetic drum is then rotated to reproduce the selected voice information.

11 Claims, 5 Drawing Figures

MAGNETIC DRUM/HEAD SYSTEM FOR SELECTIVELY GENERATING RECORDED VOICE INFORMATION

BACKGROUND OF THE INVENTION

The present invention relates to an electromagnetic system for selectively reproducing voice signals which have been recorded in a recording media, and more particularly to a voice generation or announcing system, which is used, for example, in a device for reproducing a warning sound or voice as is applied to vehicles, or vending machines, the device regenerating voice signals such as "Lock the door!" when a driver leaves his car without locking the doors, and "Thank you so much." when a purchaser inserts predetermined amount of coins into a slot of a vending machine.

The system as described above will be referred to hereinafter in the specification as a voice generation system.

In various fields in which the voicing system is applied, it is required that a number of pieces of information be selectively and very rapidly voiced and that the system can be miniaturized and can be formed in quite a simple structure.

A magnetic endless tape has been used in the past systems for voice generation. The magnetic tape is preferred in sequential addressing use, but a relatively long access time is required for selectively reproducing a particular piece of voice information. Further, such a system has unnecessary frictional movement of the magnetic tape relative to a magnetic head during all the period of time when searching for a predetermined recorded information.

In order to shorten the access time, a magnetic drum will be considered as a recording medium in place of the endless magnetic tape. However, when the magnetic drum is used, various problems owing to its circumferential peculiarities should be solved, and magnetic drums of the known type do not meet with specific requirements of the voice generation system. For example, in order to attain miniaturization of the system, which is a common requirement in various fields of application, the magnetic drum should be constructed as small as possible and rotated very slowly. Accordingly, a magnetic head should be designed to frictionally or physically contact with a surface of the magnetic drum so as to obtain a clear, desired voice reproduction. This means that a principle of a so-called "flying head" which is applied extensively in the field of a digital recording system is not applicable to the voice generation system to which the present invention relates.

In a known magnetic drum system as is applied in various fields in which an information track or channel is searched while the magnetic drum is being rotated at a relatively high speed, the magnetic head approaches the selected track of the drum by way of other unselected tracks with the magnetic head being in contact with the magnetic drum. Accordingly, it is likely that the magnetic head and drum are rapidly worn out due to an unnecessary frictional contact between the drum of high speed rotation and the magnetic head. An attempt may be made in which the magnetic head is jumped up from the magnetic drum surface to a predetermined track of a selected information, but to do so on additional complex device for controlling and jumping the magnetic head is needed. Besides, when the magnetic head comes to contact with the magnetic drum, a resistance or load is added to the magnetic drum, resulting in an increase of wow/flutter and consequently undesired reproduction of the recorded information.

SUMMARY OF THE INVENTION

An object of the present invention is to provide a voice generation system which can meet with a miniaturization requirement.

Another object of the present invention is to provide a new voice generation system which can prevent the magnetic head as well as magnetic drum from being worn out, by preventing unnecessary frictional contact between the magnetic drum and head while the selection of an information track in the drum is being carried out.

Another object of the present invention is to provide a voice generation system which permits a constant, smooth rotation of the magnetic drum without applying a load or resistance to the drum so that a clear voice information of natural tone and speed is reproduced.

Briefly, the voice generation system according to the invention has a magnetic drum which has a plurality of tracks in which prescribed voice information is recorded and a zone in which any no information is recorded. The non-recording zone is formed between a starting point and a terminating point of the recording zone. When track selection is carried out, the magnetic drum is held still and the magnetic head is controlled to travel along the non-recording zone to the selected track, and thereafter the magnetic drum is rotated slowly to reproduce the selected voice information.

In a preferred formation of the magnetic drum, a seamless tube is made of a mixture of rubber and magnetic material, cut to a predetermined length and resiliently and forcibly mounted around a cylindrical body to form a magnetic drum. Further, a rubber ring may be mounted rigidly to the cylindrical body so that a capstan axis is in direct contact with the circumference of the rubber ring to rotate the magnetic drum.

In order to eliminate a frictional resistance between the magnetic drum and the magnetic head, an oil-impregnated pad may be attached to the drum so that the oil such as, for example, silicone oil may be coated on the circumference of the magnetic drum while it is rotated.

DETAILED DESCRIPTION OF PREFERRED EMBODIMENTS

Figure 1:
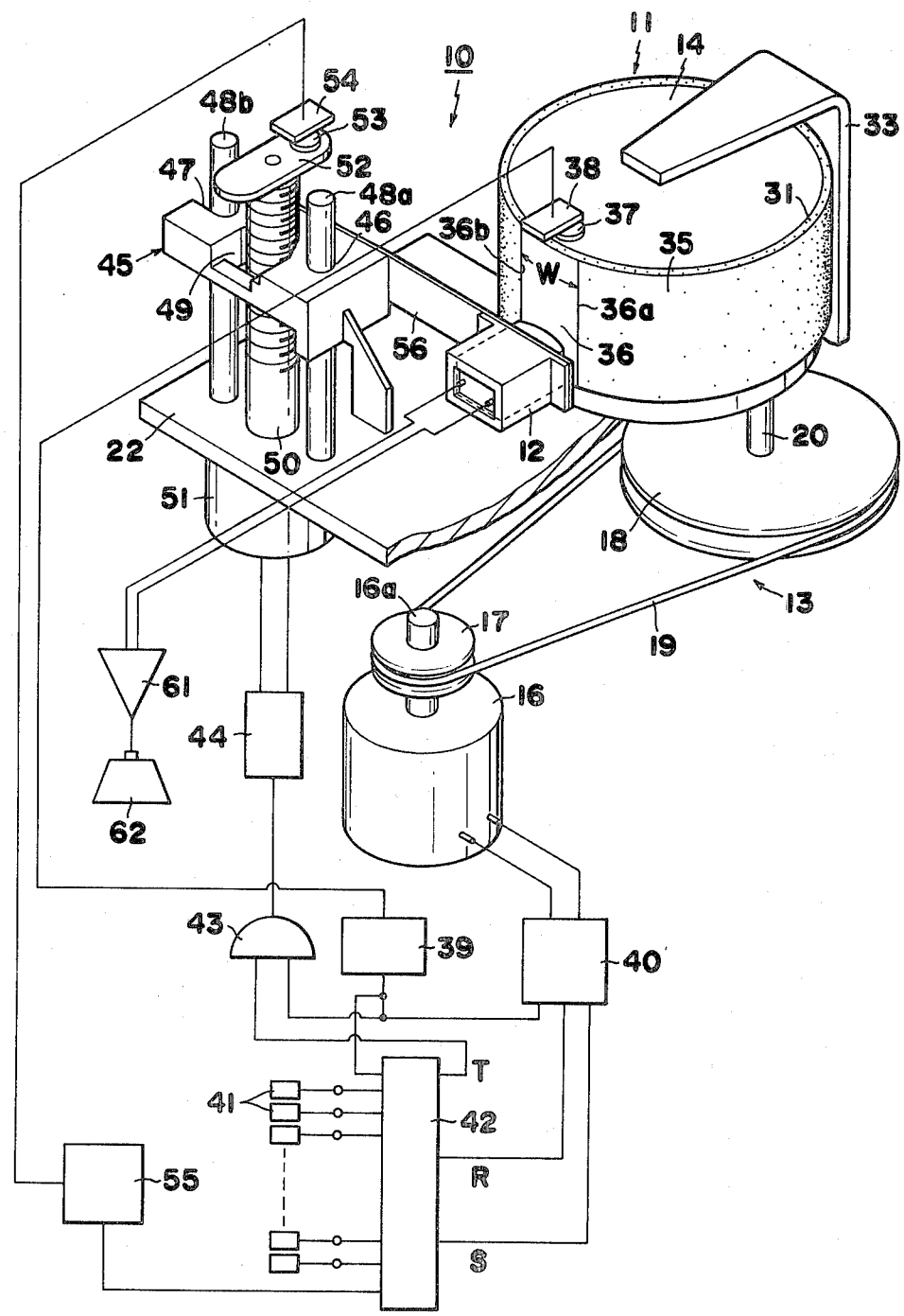
FIG. 1 is an explanatory perspective view of a voice generation system embodying the invention, also showing diagramatically an electric circuit applicable to the system.

Like reference numerals represent like parts in the different views of the drawings.

Referring first to FIG. 1, a voice generation system which is generally indicated at 10 has a magnetic drum 11, which is rotated by a suitable mechanism 13, and a magnetic head 12. The magnetic drum 11 may be formed, as usual, by coating magnetic material on the circumference of a drum body made of metal or synthetic resin, or by winding an elongated magnetic sheet around the drum body 14 but it is preferred that the magnetic drum 11 be constructed by forming at first, through a general extrusion method, a seamless tube composed of magnetic materials such as $\gamma$-$Fe_2O_3$ and rubber such as, for example, NBR, cutting the formed seamless tube into a predetermined length and then mounting forcibly the cut seamless tube around the drum body 14 against a resilient force of the seamless tube. It is preferred that the seamless magnetic tube has Shore hardness of 65–85 ("A" scale). The seamless tube which is cut to a predetermined length as described above has an inner diameter smaller than the diameter of the drum body 14 so that the seamless tube may be snugly and forcibly fitted on the drum body 14. The seamless magnetic tube can be easily formed by known method to eliminate a disadvantage of non-alignment or offset which inevitably occurs at the starting and terminating ends of a magnetic sheet when the magnetic sheet is wound around the drum body 14, and which must be made flush with each other by necessary surface finishing.

Figure 2:
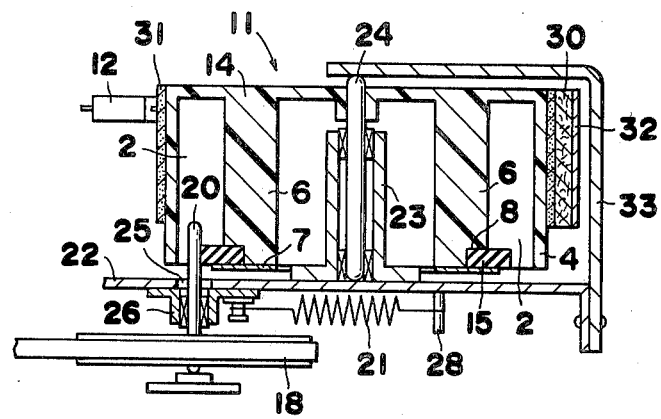
FIGS. 2 and 3 are a sectional view and a plan view, respectively, of a magnetic drum and its associated parts and elements according to the preferred embodiment of the invention.

In FIGS. 1 and 2, the drum body 14 of the magnetic drum 11 has a concentric annular recess 2 to form an outer wall 4 and inner wall 6, and a rubber ring 15. The rubber ring 15 is snugly fitted to a recessed port 8 which is formed at the end of the inner wall 6 as shown in FIG. 2, and held by a ring 7.

The magnetic drum 11 is rotated by a motor 16 through a transmission 13 having a pulley 17 rigidly connected to an output shaft 16a of the motor, a flywheel 18 operatively connected to the pulley 17 by means of an endless belt 19 and a capstan axis 20, one end of which is coaxially fixed to the flywheel 18. The capstan axis 20 is closely engaged with the circumference of a rubber ring 15 by means of a simple, suitable device such as a helical spring 21. Provision of the rubber ring 15 in combination with the capstan axis 20 can minimize a wow/flutter component and meet a requirement of resistance to impact shock.

The magnetic drum 11 is rotatably supported on a base plate 22 by means of a bearing 23 fixed to the base plate 22 and a shaft 24 journaled in the bearing 23. The flywheel 18 has a capstan axis 20 projecting through an aperture 25 of the base plate 22 and journaled in a bearing 26 which is fixed to the base plate 22 in a concentric relation to the aperture 25 such that the capstan axis 20 is closely contacted with a rubber ring 15. In order to facilitate the close, resilient contact between the capstan axis 20 and the rubber ring 15, a helical spring 21 is provided in such a manner that one end of the spring 21 is connected to the bearing 26 for the capstan axis 20 and the other end to a pin 28 which is fixed to the base plate 22 or any other stationary part to urge the capstan axis 20 against the rubber ring 15, as shown in FIG. 2.

Figure 3:
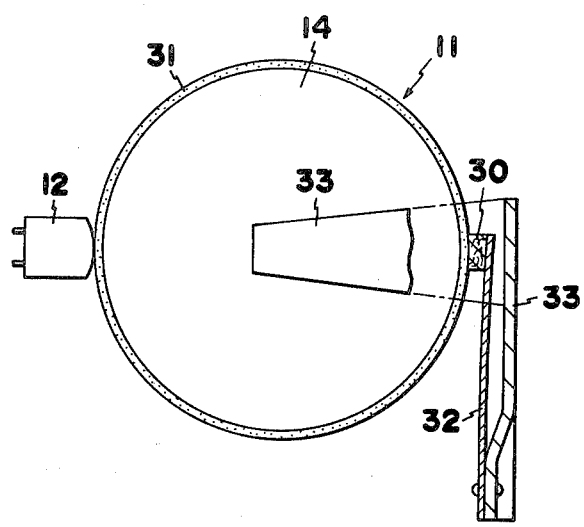

In FIGS. 2 and 3, the magnetic drum 11 in the illustrated embodiment has an oil-impregnated pad 30 which is in a slidable contact with a magnetic layer 31, the layer being preferably formed with a rubber tube containing magnetic materials and mounted around the drum body 14 as described above. The oil-impregnated pad 30 is attached to an end of a leaf spring 32 which is fixed at its other end to a frame 33. Thus the oil-impregnated pad 30 is resiliently contacted with the magnetic layer 31. The pad 30 is preferably made of materials such as felts or the like which has a desired property of containing oil such as silicone oil.

Referring back to FIG. 1, the magnetic drum 11, in which predetermined voice information is recorded in each track thereof, has a recording zone 35 for recording therein necessary information to be voiced around the circumference except for a non-recording zone 36 which is formed in parallel with the axis of the magnetic drum 11 such that the recording zone starts at one end 36a of the non-recording zone 36 and terminates at the other end 36b of the same. The non-recording zone 36 has a width which is large enough to permit the magnetic drum to be in a normal rotational speed by the time when the magnetic head 12 arrives at the selected information track of the recorded zone 35. Practically, the width "w" of the non-recording zone 36 is selected in accordance with properties of the motor 16 and of the transmission mechanism 13, and it may be selected to be about a tenth (1/10) or less of a total circumferential length of the magnetic drum since the drum is rotated very slowly, for example, at ¼ rotation per a second.

The non-recording zone 36 is detected by the combination of a permanent magnet 37 and a magnetic detecting element such as Hall-effect device 38. The permanent magnet 37 is fixed to a side of the magnetic drum 11 while the Hall-effect device 38 is disposed such that it will be in a spaced confronting relation to the permanent magnet 37 when the non-recording zone 36 is in contact with the magnetic head 12. An output of the Hall-effect device is fed to, and detected by, a non-recording zone detector 39.

A motor controlling device 40 is provided which can stop rotation of the magnetic drum 11 at the exact time when the magnetic head 12 is in a confronting relation to the non-recording zone 36, by supplying a predetermined signal to the controlling device 40. Detectors 41 have a function to detect various data of other information, and outputs thereof are fed to a data processor 42, which has functions to generate signals for track selection in response to the output from the detectors 41, signals for generating voice information recorded in the magnetic drum 11, and signals for stopping the rotation of the drum 11 in case that another track should be selected, while the selected information is being reproduced or voiced, by some reasons based upon the outputs of the detectors 41, or in case that the rotation of the drum 11 should be stopped by some other reasons. The data processor 42 may be formed by employing known logic circuits in a known manner or by utilizing a microprocessor, and a detailed description will not be made. The electric circuitry such as the drive control circuit 44, the controlling device 40, the detectors 39, 41 and processor 42 will be readily understood from their operation, which will be described later.

The magnetic head 12 which slidably contacts the magnetic layer 31 of the magnetic drum 11 is fixed to a carriage 45. The carriage 45 has a through-hole 46 through which a guide post 48a is movably inserted, a recess 47 to which a guide post 48b is inserted, and a central hole 49 having threaded grooves (not shown) mating with a threaded shaft 50. The threaded shaft 50 is connected directly to an output shaft of a motor such as a stepping motor 51, but may be connected to the same through a gear mechanism (not shown). The threaded shaft 50 has at its top end a magnet holder 52 on which a permanent magnet 53 is provided. A Hall-effect device 54 is provided so that it is in a spaced confronting relation to the permanent magnet 53, as similar as the permanent magnet 37 and the Hall-effect device 38 of the magnetic drum 11. An output of the Hall effect device 54 is fed to a the data processor 42 through a track detection circuit 55 which detects whether the carriage 45 has moved by a single track of the magnetic drum 11.

By the construction as described above, when the stepping motor 51 is energized by electric pulses supplied from the drive-control circuit 44, the threaded shaft 50 is rotated to move the carriage 45 along the guide posts 48a, 48b and consequently the magnetic head 12 is moved in parallel to the axis of the magnetic drum 11 while the head 12 is in contact with the magnetic circumference of the drum 11.

The magnetic head 12 is connected to the carriage 45 by means of a leaf spring 56. Rotation of the threaded shaft 50 provides a movement of the carriage along the guide posts 48a and 48b, and consequently a movement of the magnetic head 12 in parallel to the axis of the magnetic drum 11.

Figure 4:
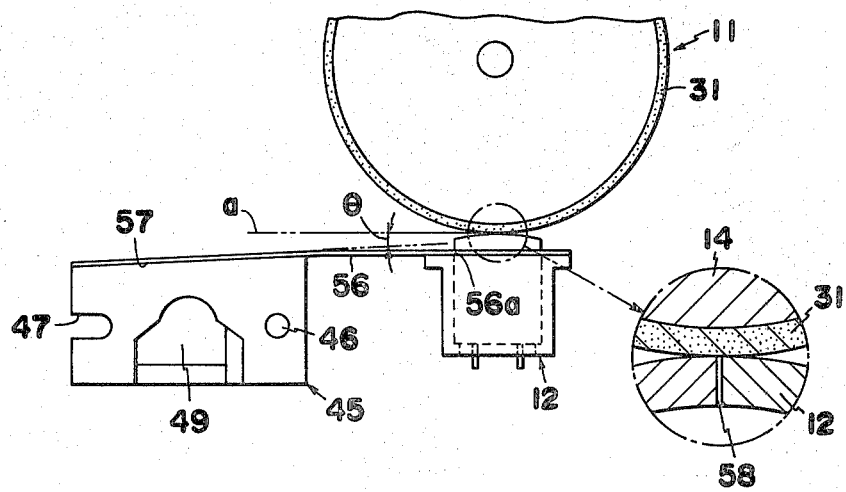
FIG. 4 is a plan view of a device for selectively movably holding a magnetic head in position relative to a magnetic drum.

As shown in FIG. 4, the carriage 45 has side 57 to which the leaf spring 56 is fixed, and the side 57 is inclined at an angle ($\theta$) relative to tangential line (a) of the magnetic drum 11. The magnetic head 12 which is resiliently pressed against the magnetic drum until an extended portion 56a of the leaf spring 56 becomes substantially parallel to the tangential line (a). In this instance, a head gap 58 of the magnetic head, which is enlarged in FIG. 4, is contacted precisely with the magnetic drum. The inclined angle ($\theta$) can be selected from 1°-4° but it depends on factors such as spring constant of the leaf spring 56.

Figure 5:
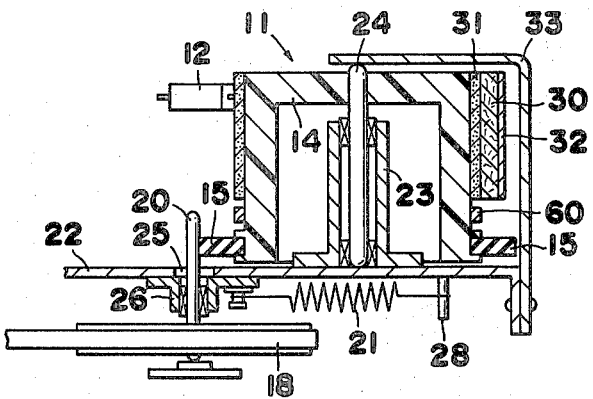
FIG. 5 is a sectional view of a magnetic drum and its peripheral parts, showing a modified structure of the magnetic drum illustrated in FIGS. 2 and 3.

In FIG. 5 which shows another embodiment of the invention, a rubber ring 15 is firmly mounted to an outer surface of the drum body 14. A ring shaped oil stopper 60 is fixed to the circumferential surface of the drum body 14 at the position between an oil-impregnated pad 30 and the rubber ring 15 so as to prevent the oil which might leak from the oil pad 30 from penetrating the rubber ring 15 with which the capstan axis 20 is firmly contacted. The oil stopper 60 is made of felts, blotting paper or any other suitable materials which can absorb the oil. Other structure of the magnetic drum 11 and its associated parts such as bearings 23, 26 fixed to the base plate 22, the helical spring 21, the flywheel are considered to be similar to the structure shown in FIG. 2, and a further detailed description will not be made.

An operation will be described with reference to the structure shown in FIG. 1. It is assumed first that the magnetic drum 11 is stopped and held still with the non-recording zone 36 being in a confronting relation to the magnetic head 12. When any one of the recorded information is selected in accordance with a status of outputs from the detectors 41, a track information "T" which is to be selected by the processor 42 such as, for example, an information of electric pulses for rotating the stepping motor 51, is generated.

When the track information "T" coincides, within an AND gate 43, with the information that the magnetic drum 11 is stopped with the non-recording zone being in a confronting relation to the magnetic head 12, the stepper motor 51 is driven to move the magnetic head 12 so as to select an information track of the magnetic drum 11. Movement of the magnetic head 12 is detected by the permanent magnet 53 and Hall-effect device 54.

Selection of the track is performed within the non-recording zone 36 while the magnetic drum 11 is suspended. The information processor 42 supplies a signal "R" for reproducing a recorded information to the motor controlling device 40 with a delay time which is required for completing the selection of the information track. When the signal "R" enters, the motor controlling device 40 supplies an electric current to the motor 16 to rotate the magnetic drum 11 through the transmission mechanism 13. Thus, the selected information which is recorded in a predetermined track of the magnetic drum 11 is reproduced or voiced by means of the magnetic head 12, amplifier 61 and speaker 62. Predetermined track can be selected at a time or repeatedly or otherwise sequentially by the information processor 42.

It will be understood that the AND gate 43 may be disposed within the processor 42, and that an electromagnetic clutch mechanism in combination with a cam mechanism may be employed in place of the stepping motor, though not illustrated in the drawings, so as to select a track of the magnetic drum. Further, an optical device can be used in place of the combination of the permanent magnet and the Hall-effect device.

In a case that several voice information should be announced, a stop-signal S is fed from the data processor 42, the signal indicating to stop a rotation of the magnetic drum 11. Based upon the coincidence between an output from non-recording zone detector 39 indicating that the magnetic drum 11 is driven until its non-recording zone 36 becomes in a confronting relation to the magnetic head 12 and the aforesaid stop-signal S, the motor controlling device 40 functions to stop the rotation of the magnetic drum 11. Accordingly, the magnetic drum 11 stops such that the non-recording zone 36 is in a confronting relation to the magnetic head 12. The data processor 42 delivers an output "T" of a track to be selected in the next stage after the signals from the non-recording zone detector 39 are fed to the data processor. Successive operations is understood to be similar to the operations described above.

Although the present invention has been described with reference to preferred embodiments thereof, many modifications and alterations may be made within the spirit of the invention.

What is claimed is:
1. Magnetic drum/head system for selectively generating a recorded voice information comprising:
   a. a magnetic drum having a magnetic layer on a circumference of a cylindrical drum body, said magnetic drum having a recording zone occupying a substantial circumference of said magnetic drum and a non-recording zone between a starting end of the recording zone and an terminating end of said recording zone,
   b. driving means for selectively rotating said magnetic drum,
   c. a magnetic head contacting with an information track formed on said magnetic drum for generating the recorded voice information,
   d. a carriage for holding said magnetic head in an abutment relation to said magnetic drum,
   e. detection means for detecting said non-recording zone being in a predetermined position so that said magnetic drum is stopped with the non-recording zone thereof being in a confronting relation to said magnetic head,
   f. carriage driver means for selectively moving said carriage relative to said magnetic drum when said magnetic head is in a confronting relation to said non-recording zone, thereby shifting the position of said magnetic head to a selected information track of said magnetic drum, and g. electric circuit means for amplifying and voicing the recorded information.

2. The system according to claim 1, in which said magnetic drum has a rubber ring attached to the drum body, said driving means having a motor and a capstan axis rotated by said motor, said capstan axis being closely contacted with said rubber ring.

3. The system according to claim 2, in which said drum body has an annular recess on one side thereof to form an inner wall and an outer wall, said rubber ring being attached to said inner wall, said capstan axis projecting into said annular recess and firmly engaged with said rubber ring.

4. The system according to claim 1, in which said magnetic layer of the magnetic drum is a resilient seamless tube, said seamless tube containing rubber and predetermined magnetic materials, said tube being cut to a predetermined length and mounted forcibly to said cylindrical body, thereby forming a magnetic drum having a seamless surface.

5. The system according to claim 2, in which said system has a base plate, a bearing fixed to said base plate, said capstan axis being journaled in said bearing, and a spring for urging said bearing toward the center of said magnetic drum, thereby urging said capstan axis against said rubber ring.

6. The system according to claim 5, in which said capstan axis has a flywheel, said flywheel being connected to an end of said capstan axis and operatively connected to an output shaft of said motor.

7. The system according to claim 1, in which said detection means has a permanent magnet and a detector element, said permanent magnet being fixed to a predetermined position of said magnetic drum, said detector element being in a spaced confronting relation to said permanent magnet when said non-recording zone of the magnetic drum is in a confronting relation to said magnetic head.

8. The system according to claim 1, in which said carriage has a threaded hole, and in which said carriage driver means has a stepping motor and a threaded shaft mated with said threaded hole, said threaded shaft being operatively connected to an output shaft of said stepping motor, whereby when said threaded shaft is rotated by said stepping motor, said carriage is moved to thereby shift the position of said magnetic head in parallel to an axis of said magnetic drum so that the magnetic head approaches to a selected information track of said magnetic drum.

9. The system according to claim 1, in which said non-recording zone has a width said width being about a tenth of the total circumferential length of said magnetic drum.

10. The system according to claim 1, in which said magnetic drum has a pad impregnated with silicone oil, said pad being slidably and resiliently contacted with the circumference of said magnetic drum.

11. The system according to claim 1, in which said carriage has a leaf spring, one end of which is fixed to said carriage, the other end of said leaf spring being fixed to said magnetic head, said magnetic head being pressed resiliently against said magnetic drum by means of said leaf spring.

* * * * *